US011399213B2

United States Patent
Mendenhall et al.

(10) Patent No.: US 11,399,213 B2
(45) Date of Patent: Jul. 26, 2022

(54) MEDIA DEVICE UPGRADING SYSTEM

(71) Applicant: ROKU, INC., Los Gatos, CA (US)

(72) Inventors: David Mendenhall, Los Gatos, CA (US); David Sharp, San Jose, CA (US); Mark Ely, Knowles, CA (US); Jim Funk, Los Altos, CA (US); Charles Smith, Andover, MA (US); Andrew Schultz, Los Gatos, MA (US); Anthony Wood, Palo Alto, CA (US)

(73) Assignee: ROKU, INC., Los Gatos, CA (US)

( * ) Notice: Subject to any disclaimer, the term of this patent is extended or adjusted under 35 U.S.C. 154(b) by 0 days.

(21) Appl. No.: 16/357,740

(22) Filed: Mar. 19, 2019

(65) Prior Publication Data

US 2019/0297383 A1   Sep. 26, 2019

Related U.S. Application Data (60) Provisional application No. 62/646,994, filed on Mar. 23, 2018.

(51) Int. Cl.
*H04N 21/2387* (2011.01)
*H04N 21/258* (2011.01)
(Continued)

(52) U.S. Cl.
CPC ... *H04N 21/4586* (2013.01); *H04N 21/43635* (2013.01); *H04N 21/443* (2013.01)

(58) Field of Classification Search
None
See application file for complete search history.

(56) References Cited

U.S. PATENT DOCUMENTS

2009/0077549 A1*  3/2009  Sadja .................... G06F 8/65
                                                        717/178
2010/0011404 A1   1/2010  Douillet et al.
(Continued)

FOREIGN PATENT DOCUMENTS

KR   10-2004-0044236 A   5/2004
KR   10-2006-0027170 A   3/2006

OTHER PUBLICATIONS

International Search Report and Written Opinion of the International Searching Authority directed to related International Patent Application No. PCT/US2019/023102, dated Jul. 4, 2019; 13 pages.
(Continued)

*Primary Examiner* — Brian T Pendleton
*Assistant Examiner* — Jean D Saint Cyr
(74) *Attorney, Agent, or Firm* — Sterne,, Kessler, Goldstein & Fox P.L.L.C.

(57) ABSTRACT

Disclosed herein are system, method, and computer program product embodiments for a media device upgrading system. An embodiment operates by receiving a command at a media device that includes an upgrader device connected via or plugged into an input port of the media device. It is determined that the command is associated with modifying a software component of the media device, wherein both the media device and the upgrader device include operating systems configured to process the command and modify the software component. The command is provided to the upgrader device based on a determination that the media device is in an upgrader mode of operation. A visual indication corresponding to the modification is provided.

22 Claims, 5 Drawing Sheets

(51) Int. Cl.
*H04N 21/262* (2011.01)
*H04N 21/418* (2011.01)
*H04N 21/436* (2011.01)
*H04N 21/4363* (2011.01)
*H04N 21/442* (2011.01)
*H04N 21/443* (2011.01)
*H04N 21/45* (2011.01)
*H04N 21/458* (2011.01)

(56) References Cited

U.S. PATENT DOCUMENTS

| | | | |
|---|---|---|---|
| 2013/0194246 A1* | 8/2013 | Na | G09G 3/20 |
| | | | 345/211 |
| 2013/0194500 A1* | 8/2013 | Na | G06F 8/65 |
| | | | 348/553 |
| 2013/0258195 A1* | 10/2013 | Chung | H04N 21/4183 |
| | | | 348/554 |
| 2013/0258204 A1 | 10/2013 | Chung et al. | |
| 2015/0046968 A1* | 2/2015 | Lee | H04N 21/8173 |
| | | | 725/132 |
| 2017/0269927 A1* | 9/2017 | Yuan | G06F 8/654 |

OTHER PUBLICATIONS

English language abstract of KR10-2004-0044236-A, published May 28, 2004, retrieved from https://patentscope.wipo.int/.
English language abstract of KR10-2006-0027170-A, published Mar. 27, 2006, retrieved from https://patentscope.wipo.int/.

* cited by examiner

MEDIA DEVICE UPGRADING SYSTEM

CROSS-REFERENCE TO RELATED APPLICATIONS

This application claims priority to U.S. Provisional Appl. No. 62/646,994 titled "Media Device Upgrading System," filed Mar. 23, 2018, which is herein incorporated by reference in its entirety.

TECHNICAL FIELD

This disclosure generally relates to the upgrading of media devices.

BACKGROUND

Smart televisions allow a user to access different applications that provide on-demand access to different types of content from different content providers. While these apps are often upgraded and changed, particularly to take advantage of new and ever advancing technology, the hardware in old (previously purchased) televisions remains the same. With this divergence, it does not take much time for old TVs to lose the ability to effectively support and run new apps.

SUMMARY

Various embodiments are described throughout this specification. This disclosure is not limited to the summary provided herein.

An example embodiment may include a computer-implemented method. A command is received at a media device that includes an upgrader device connected via or plugged into an input port of the media device. The command is determined to be associated with modifying a software component of the media device. Both the media device and the upgrader device include operating systems configured to handle the command and modify the software component accordingly. The command is provided to the upgrader device based on a determination that the media device is in an upgrader mode of operation. A visual indication corresponding to the modification is provided via the media device.

Another embodiment may include a system. The system includes a memory and one or more processors coupled to the memory. The one or more processors are configured to receive a command that includes an upgrader device connected via or plugged into an input port of a media device. The command is determined to be associated with modifying a software component of the media device. Both the media device and the upgrader device include operating systems configured to process the command and modify the software component accordingly. The command is provided to the upgrader device based on a determination that the media device is in an upgrader mode of operation. A visual indication corresponding to the modification is provided via the media device.

Another embodiment may include another computer-implemented method. At a media device, an indication that an upgrader device is connected via or plugged into an input port of the media device may be received. An indication to enter an upgrader mode of operation for the media device is received. The media device is configured to process one or more hardware commands for modifying an operation of the media device when received from a remote control. The media device is configured to provide one or more operational commands to the upgrader device. An indication that the media device is operational in the upgrader mode is provided.

Another embodiment may include an upgrader device coupled to a television (TV), where the TV includes first hardware and a first operating system (OS). The upgrader device may include second hardware that has at least one processor, and a second OS. The processor may be configured to execute commands for the TV using the second hardware and the second OS, wherein the first hardware and the first OS of the TV are incapable of adequately executing the commands.

In another embodiment, the upgrader device may be part of a connected device having content and functionality, and wherein the processor is further configured to provide the content and functionality of the connected device to the TV using, for example, the second hardware and/or the second OS.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a television or other media device upgrading system.

Figure 1:
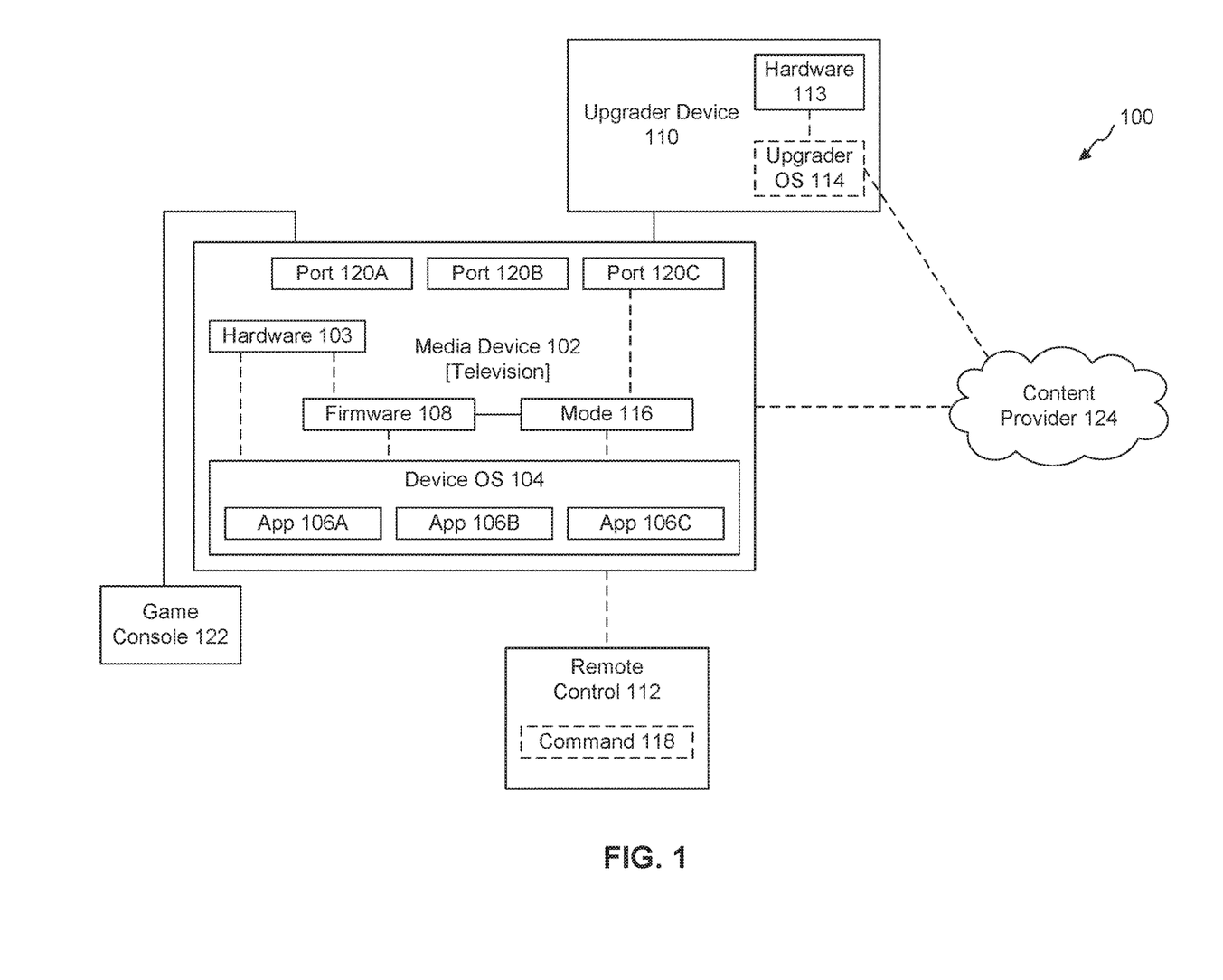
FIG. 1 is a block diagram illustrating a media device upgrading system, according to some embodiments.

FIG. 1 is a block diagram 100 illustrating a media device upgrading system, according to some embodiments. Media device 102 may be any device capable of receiving and outputting media in audio and/or visual form. Example media devices include televisions (including smart televisions), streaming media players, laptops, desktops, mobile phones, soundbars, voice responsive devices (such as voice responsive speakers, personal digital assistants, etc.), wearable computing devices, appliances, internet of things (IoT) devices, and/or other computing devices. For purposes of illustration, and not limitation, media device 102 may sometimes be referred to herein as a television (which may include a smart television capable of receiving streaming or other network-based or cloud-based content), but it is understood that in other embodiments, other types of media devices may be used.

Media device 102 may be configured with a device operating system 104 which is configured to execute various applications or apps 106 using the hardware of media device 102. The various hardware components of media device may include one or more processors, memory (e.g., such as random access memory, buffers, cache, etc.), audio and video decoders, wireless communication modules (Wi-Fi, Bluetooth, infrared, motion detection, etc.), speakers, screen display and resolution modules, and/or other components. Such hardware components are generally collectively indicated as hardware 103 in FIG. 1. These various hardware components 103 may be operated by or accessed through firmware 108 of the media device 102.

Generally speaking, at the time of manufacture, the hardware included in a given television may be state-of-the-art and capable of supporting the newest apps 106. But, as technologies change and advance, the processing capabilities of new televisions similarly change and advance. Seeking to optimize the user experience, app developers may upgrade or change the operations and/or requirements of apps 106 to take advantage of new hardware and computer processing technologies. But, the hardware of previously manufactured televisions remains the same. Over time, the changes to apps 106 that take advantage of new technology may cause a degradation of the user experience in older televisions (e.g., due to slow processor speeds, limited memory, outdated decoders, and/or other inabilities to support the latest apps 106).

Eventually, some of the apps 106 may no longer be functional in older televisions, or the user experience may be degraded to such a point that a user or customer may be forced to take action. Conventionally, the only possible solutions were (1) for the user to refurbish his older TV with new hardware and software, a process that was time consuming, expensive, and technically challenging process; or (2) for the user to purchase a new television or media device altogether, which was often even more expensive than refurbishing.

However, in embodiments of this disclosure, rather than resorting to either of these unenviable and expensive options, an upgrader device 110 may be used to upgrade a user experience with an existing older television (where an example of such older television is represented by media device 102 in FIG. 1). Upgrader device 110 may provide new hardware functionality capable of supporting the changes in apps 106 that are intended to take advantage of hardware capabilities (of hardware 103) beyond that which were originally provided in media device 102. For example, upgrader device 102 may provide more, enhanced, or faster processors, memory, decoders, etc. In this manner, upgrader device 110 may extend the useful lifespan of media device 102 by supporting the execution of new and upgraded apps 106 through leveraging the upgrader device's more state-of-the-art hardware capabilities working in combination with the original hardware capabilities of media device 102.

In an embodiment, upgrader device 110 may include a digital media player that is configured to stream audio, video, and other content to or in coordination with media device 102. Upgrader device 110 may also allow a user to access the Internet, play games, check e-mail, or perform other network and non-network based functionality as well. However, unlike a traditional media player, which may include a separate device with its own user interface (UI) that replaces the original television UI functionality, upgrader device 110 may be configured to operate with and improve the native UI experience of media device 102.

In an embodiment, upgrader device 110 may leverage some of the original hardware 103 of media device 102 to provide a user with the perception and "look and feel" as if the original media device OS 104 is still being operated (e.g., by using a similar user interface and/or remote control). Accordingly, from an end user point-of-view, the functionality of media device 102 may appear to be the same, even while the responsiveness and capabilities may be improved through leveraging the more powerful and expanded hardware capabilities of the upgrader device 110.

While a traditional media player may have its own remote control and interface for operation, in an embodiment, upgrader device 110 may be configured to operate using a remote control 112 associated with media device 102. For example, the remote control 112 may be the same original remote control that came with television 102 when it was manufactured, and may be used to both control the operation of the television hardware 103 (such as power, volume, display settings, input selection, etc.) and the device OS 104 functionality (such as menu selections, downloading and launching applications 106, operating the apps 106, etc.).

In addition, upgrader device 110 may leverage the existing functionality of remote control 112 and allow a user to also interact with and control upgrader OS 114 and hardware 113 in the upgrader device 110, in the same manner as the user was able to interact with and control device OS 104. In an embodiment, upgrader OS 114 may communicate and interact with device OS 104 and/or firmware 108 such that at least a portion of the functionality previously handled by device OS 104 is handled by upgrader OS 114 when media device 102 is in an upgrader mode 116.

Accordingly, through the operation and features just described (and further described below), the upgrader device 110 operates seamlessly with the media device 102 to provide an integrated experience for the user. Unlike some prior approaches (such as plugging a new Blu Ray player or streaming device component into an old television), the user is not required to manage two devices independently with two separate remote controls and differing user interfaces. Instead, the upgrader device 110 operates with the media device 102 using a single remote control and the media device 102's original user interface, to provide a seamless upgrade to all aspects of the media device 102, and for the two devices to act as one unified device. To the user, he is still operating with just one device, the television, rather than two independent devices.

In an embodiment, media device 102 may include different modes 116 of operation. In a first mode of operation, called a "normal mode," media device 102 may operate using firmware 108 and device OS 104. In a second mode of operation, called an "upgrader mode," media device 102 may operate using firmware 108 and upgrader OS 114, and also potentially device OS 104.

In an embodiment, when a command 118 is received from remote control 112, media device 102 may determine whether the command 118 is one to be handled by the media device 102's original hardware 103 and/or device OS 104, or to be handled by the upgrader device 110's hardware 113 and/or upgrader OS 114. In an embodiment, this is done by determining whether the command 118 is a hardware command (to be handled by firmware 108, hardware 103 and/or device OS 104) or an operational or software command (to be handed by either device OS 104, upgrader OS 114, or hardware 113). In an embodiment, the operational command 118 may be provided to device OS 104 for processing during normal mode 116, and to upgrader OS 114 for processing during upgrader mode 116. In some alternative embodiments, the upgrader device 110 (hardware 113 and/or upgrader OS 114) may at least partially assist with implementing both hardware and software commands.

From an end-user point-of-view, the operations and functionality of media device 102 may appear the same, regardless of whether a command 118 is being handled or processed by device OS 104 versus upgrader OS 114, or hardware 103 versus hardware 113. For example, the menu and other UI interactions may appear the same regardless of which mode of operation 116 is active. This may simplify the use of upgrader device from a user point-of-view, because an existing user of media device 102 does not have to learn a new UI; rather, the user continues to use the original, native UI of the media device 102 (which may be operative regardless of the mode 116 of operation). In another embodiment, media device 102 may include a visual or other indicator that differentiates between normal mode 116 and upgrader mode 116. For example, the color of a menu may change, or the display may indicate that upgrader mode is active. In an embodiment, a user may be provided an option of using a new UI that may be available using upgrader OS 114, or the original UI that was accessible using device OS 104. Or, for example, upgrader OS 114 may provide additional functionality or options using the native UI 'look' and 'feel' that may have been unavailable using device OS 104.

As noted, in some embodiments, command 118 may involve either a hardware command or an operational or software command. In some embodiments, hardware commands are those that involve device-specific interactions with hardware features of the media device 102, such as a request to adjust the input or output settings of media device 102. Other example hardware commands may include requests to adjust the volume, adjust display settings (e.g., tint, hue, brightness, color), adjust audio controls (e.g., bass, treble, balance), and switch active input ports 120. For example, a command 118 to make the active input port 120A so that a user may play a video game on game console 122 (or watch a DVD) may be handled by firmware 108 and/or hardware 103. In an embodiment, hardware commands may be handled, processed and executed by firmware 108 and hardware 103 of media device 102 regardless of the mode of operation 116 of media device 102.

In some embodiments, operational or software commands may include requests to browse, purchase, download, launch, or otherwise interact with content or apps 106. For example, a user may want to download a new application 106, download content from content provider 124, or pause or rewind content via an active application 106, to name just some examples. In an embodiment, during normal mode 116, these commands may be handled or processed by device OS 104, while during upgraded mode 116, these commands may be handled or processed by upgrader OS 114 (on behalf of or in lieu of, or working with device OS 104).

In an embodiment, upgrader OS 114 may include an operating system that visually appears similar to device OS 104, from an end user point-of-view. Upgrader OS 114 may utilize the hardware 113 of upgrader device 110 (e.g., memory, processors, decoders, etc.) to improve the performance of media device 102 during the processing of operational commands. For example, upgrader device 110 may include more and/or faster memory than media device 102, and thus may improve buffering capabilities associated with executing apps 106. Upgrader device 110 may also include faster or state-of-the-art processors or decoders, to thereby enable the media device 102 (via use of the upgrader device 110) to execute apps 106 that offer content not supported by the processing and/or decoding capabilities of the original hardware 103 of the media device 102.

In an embodiment, upgrader device 110 may include its own Wi-Fi or other networking capabilities (which may be improved over the original networking capabilities of the media device 102) to request or receive streaming content or apps 106 from an app store or content provider 124. In another embodiment, upgrader device 110 may utilize or leverage the Wi-Fi or networking capabilities in the original hardware 103 of media device 102 to download apps and content, which may then be displayed through media device 102 after being processed by upgrader OS 114 and/or hardware 113 (such as decoders, for example) of the upgrader device 110.

In an embodiment, when a user issues a command 118, the user may be unaware of whether the command 118 is being handled by firmware 108, hardware 103, device OS 104, hardware 113, or upgrader OS 114. For example, the commands accessible via remote control 112, as well as operation of the remote control 112, may remain the same during both normal mode and upgrader mode 116. In an embodiment, remote control 112 may include soft or programmable keys, and may include new or additional functionality that may be available only during upgrader mode 116 when commands 118 are being handled by upgrader OS 114.

In an embodiment, to operate with the media device 102, upgrader device 110 may first need to be recognized by media device 102. For example, upgrader device 110 may be physically inserted into one of the ports 120. Ports 120 may include a high-definition multimedia interface (HDMI) port, universal serial bus (USB) port, and/or any other port used by computing devices. In various embodiments, upgrader device 110 may be configured to connect to and operate with media device 102 through an HDMI, USB, or another input port.

In an embodiment, prior to physical insertion into a port 120, upgrader device 110 may broadcast or advertise its capabilities (e.g., for upgrading) to one or more devices over a wireless network (e.g., using the upgrader device 110's Wi-Fi or networking capabilities). For example, upgrader device 110 may use simple service discovery protocol (SSDP) which may enable discovery and communication between upgrader device 110 and media device 102. In an embodiment, a user may insert upgrader device 110 into a particular one of the ports 120, such as port 120C for example purposes (which may be an HDMI port, for example), and then send a command 118 to switch the input of media device 102 to port 120C, to thereby enable the plug-and-play capabilities and interactions between upgrader device 110 and media device 102.

In another embodiment, handshaking and/or discovery between upgrader device 110 and media device 102 may be performed after or upon insertion of upgrader device 110 into port 120C. For example, upgrader device 110 may not have networking or Wi-Fi capabilities, and may instead communication with media device 102 via a USB port (rather than using an HDMI port). Through the USB port, upgrader device 110 may be able to receive power from media device 102 and/or have access to the networking capabilities of media device 102 (through which upgrader device 110 can request or control what content or apps 106 are downloaded or streamed to the media device 102).

Accordingly, in embodiments, a network-enabled upgrader device 110 may communicate with media device 102 via an HDMI port 120, while a network-disabled (or non-enabled) upgrader device 110 may communicate with media device 102 via a USB port 120. In other embodiments, upgrader device 110 may be configured to communicate with media device 102 using the same port-type regardless of its networking or communication capabilities. In an embodiment, removing networking features from upgrader device 110 may make it possible for a smaller and/or less expensive upgrader device 110.

In an embodiment, upon an initial synchronization between media device 102 and upgrader device 110, the user may be visually prompted to confirm that the user wants to enter upgrader mode 116 and perform the synchronization or handshaking process between upgrader device 110 and media device 102. For example, the user may be asked if they want to upgrade media device 102 using an upgrader device. If the user says 'no', then upgrader device 110 may be still operational as a standard digital media player (such as a standalone, independent media stream device or Blu Ray player). However, if the user says 'yes', then the synchronization process may continue to enable a seamless connection and operation of the upgrader device 110 with the media device 102.

During synchronization or as a result thereof, bi-directional communication between upgrader device 110 and media device 102 may be enabled. During the synchronization process, upgrader device 110 may obtain information regarding the media device 102 in order to at least emulate and interact with the media device 102. Thus, for example, the upgrader device 110 may read or import configuration information, account information for a cloud account and/or for accessing content providers (such as HBO, NETFLIX, HULU, etc.), settings, preferences, history, graphical assets (so as to match, operate with, augment, enhance, emulate, etc., the TV 102's UI), WiFi credentials, and other user information from media device 102. For example, if media device 102 is a television, upgrader device 110 may copy or import an electronic program guide, port names, account information for apps 106, preferences, viewing history, and other information which may have been stored and/or used by device OS 104. In an embodiment, this information may be accessible via a flash or other memory of media device 102 (assuming the media device 102 previously exported and/or saved the information to such flash or other memory), and may be accessed and retrieved using NFS (network file system) or some other well known protocol. In some embodiments, the flash or other memory may be secured so access is limited to the upgrader device 110 and/or other authorized devices. Then, for example, during upgrader mode 116, upgrader device 110 may use the television 102 as a monitor and speaker system for playing back content, while the upgrader device 110 itself provides the media streaming functionality.

In an embodiment, if there is some functionality that is performed by device OS 104 that cannot be performed by the hardware 113 or upgrader OS 114 of upgrader device 110, then requests for that functionality may still be handled by device OS 104, firmware 108 or hardware 103, even during upgrader mode 116. Such functions/commands are called legacy operations or legacy commands. In an embodiment, when a legacy command is received, it may be transferred directly to device OS 104 for processing. In another embodiment, all operational commands may be provided to upgrader OS 114, and any legacy commands may then be transferred to device OS 104 for processing. However, an end user may be unaware of which OS 104, 114 is handling which commands 118, as the execution of the operations during both normal mode 116 and upgrade mode 116 may appear to be the same from the user's point of view, though the performance may vary depending on whether the command 118 is being handled by upgrader OS 114 and/or hardware 113 or device OS 104 and/or hardware 103.

Figure 2:
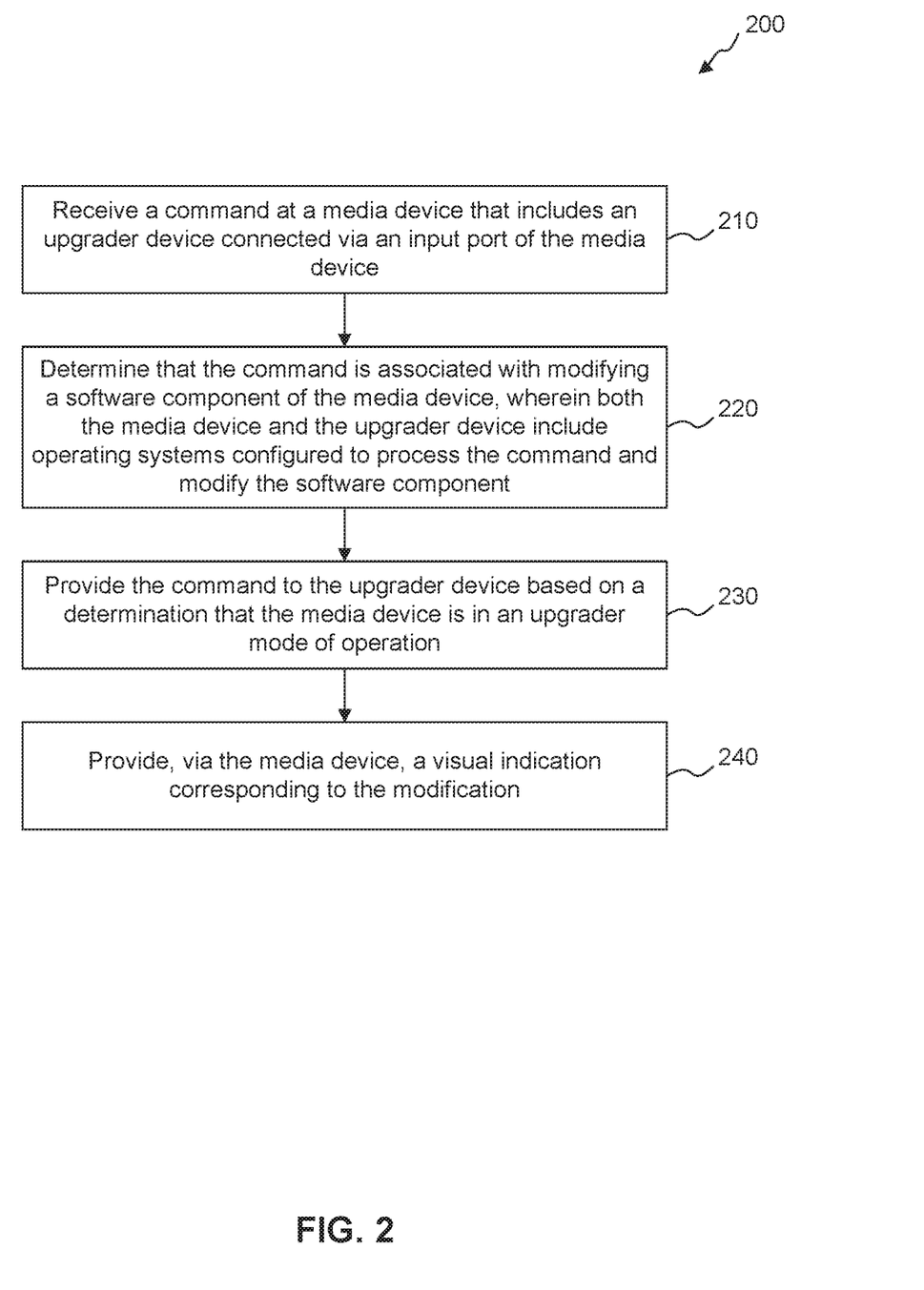
FIGS. 2 and 3 are flowcharts illustrating example operations of a media device upgrading system, according to some embodiments.

FIG. 2 a flowchart 200 illustrating example operations of a media device upgrading system, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to that example embodiment.

In 210, a command is received at a media device that includes an upgrader device connected via an input port of the media device. For example, media device 102 may receive command 118 from a remote control 112. Upgrader device 110 may be connected to the media device 102 through a physical connection to one or more of ports 120. For example, upgrader device 110 may be configured to be connect with media device 102 by plugged into an input port 120. The remote control 112 may be the same manufacturer remote control that came with television 102 at a time of purchase, and may be used to operate firmware 108, device OS 104, hardware 103, hardware 113 and upgrader OS 114.

In 220, it may be determined that the command is one associated with modifying a software component of the media device, wherein both the media device and the upgrader device include operating systems configured to process the command and modify the software component. For example, media device 102 may parse command 118 to determine whether the command 118 is a hardware command or an operational command. Hardware commands, such as adjusting the volume or changing the active input port 120, may be processed or handled by firmware 108 or hardware 103 regardless of a mode of operation 116.

In an embodiment, if the command 118 is an operational command to be handled, processed, or executed by an operating system, upgrader OS 114 may receive, process the command if the upgrader mode 116 is active or enabled. Otherwise, if the upgrader mode 116 is not active or enabled, in the default or normal mode 116, the command 118 may be handled by device OS 104. In an embodiment, there may be certain commands that are handled by device OS 104 even when upgrader mode 116 is active. Such commands, called legacy commands, are ones that are not supported by the hardware 113 and/or upgrader OS 114 of the upgrader device 110.

In 230, the command is provided to the upgrader device based on a determination that the media device is in an upgrader mode of operation. For example, upgrader device 110 may receive the command 118 from media device 102 and may process the command 118 on behalf of media device 102, when the upgrader mode 116 is active or enabled.

For example, consider an example involving the tuner in the original hardware 103 of the media device 102. Assume for this example that the hardware 113 in the upgrader device 110 does not include a tuner, so that the upgrader device 110 leverages the tuner in the hardware 103 of the media device 102. Also assume the command 118 involves content that requires decoding by the hardware 113 in the upgrader device 110. Accordingly, while in the upgrader mode 116, the upgrader OS 114 may cause the device OS 104 to forward content from the tuner in hardware 103 to the decoders in the upgrader device 110. Such decoders in the hardware 113 of the upgrader device 110 may then decode the content. The upgrader OS 114 may then forward the decoded content to the media device 102 for display. Accordingly, this example illustrates a scenario where the upgrader OS 114 coordinates operation of hardware 103 in the media device 102 and hardware 113 in the upgrader device 110 to process the command.

In 240, a visual or other indication corresponding to the modification is provided via the media device. For example, assume the command 118 involves streaming content using app 106A. Then, in this example, upgrader OS 114 may cause media device 102 (which may be a television) to display the requested content. Or, for example, command 118 may involve downloading a new app 106. In this case, the download command may cause the new app 106 to be downloaded to both device OS 104 (for use during the normal mode 116) and upgrader OS 114 (for use during the upgrader mode 116). In another embodiment, if the new app 106 is functional only when using the hardware of upgrader device 110, then it may be available to the user and functional only while the media device 102 is in upgrader mode 116.

Figure 3:
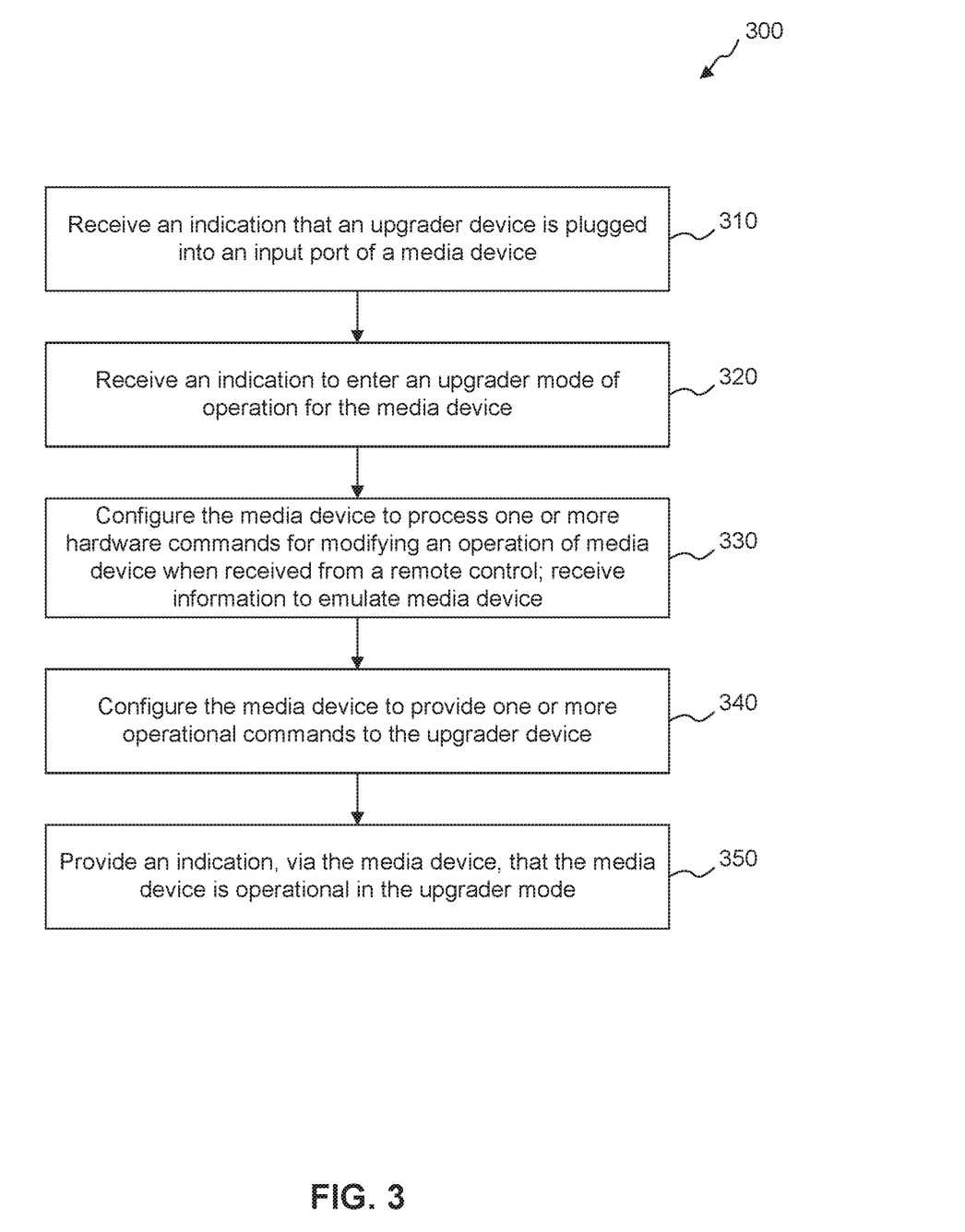

FIG. 3 is a flowchart 300 illustrating additional example operations of a media device upgrading system, according to some embodiments. Method 300 can be performed by processing logic that can comprise hardware (e.g., circuitry, dedicated logic, programmable logic, microcode, etc.), software (e.g., instructions executing on a processing device), or a combination thereof It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1. However, method 300 is not limited to that example embodiment.

In 310, an indication that an upgrader device is plugged into an input port of a media device is received. For example, input port 120C may be set as the active port when or after upgrader device 110 is inserted or otherwise connected. In an embodiment, the connection may include either a wired or wireless connection. During synchronization or as a result thereof, bi-directional communication between upgrader device 110 and media device 102 may be enabled. During the synchronization process, upgrader device 110 may obtain information regarding the media device 102 in order to emulate and interact with the media device 102.

In 320, an indication to enter an upgrader mode of operation for the media device is received. For example, the user may be prompted to indicate whether he wants to perform an upgrade using the hardware 113 of upgrader device 110. In an embodiment, media device 102 may receive a confirmation that a user wishes to upgrade media device 102 using upgrader device 110.

In 330, the media device is configured to process one or more hardware commands for modifying an operation of media device when received from a remote control. For example, during a synchronization process between upgrader device 110 and media device 102, media device 102 may receive and handle or process all hardware requests using firmware 108. In another embodiment, all commands 118 may be received by upgrader OS 114, and hardware commands are then provided to firmware 108 for processing.

The synchronization process may operate to enable a seamless connection and operation of the upgrader device 110 with the media device 102. For example, during the synchronization process, upgrader device 110 may obtain information regarding the media device 102 in order to emulate and interact with the media device 102. In some embodiments, this operation is performed prior to 330.

In 340, the media device is configured to provide one or more operational commands to the upgrader device. For example, in an embodiment, all commands 118 may initially be received and processed by media device 102, and then operational commands may be forwarded, communicated, or otherwise provided to device OS 104 in a normal mode 116, or to upgrader OS 114 in an upgrader mode 116. Operational commands may include any commands that are associated with one or more of the apps 106 or content.

In 350, an indication that the media device is operational in the upgrader mode is provided. For example, upon completion of a synchronization process, a visual display or tone may be provided that indicates whether the synchronization process was successful and whether media device 102 is operating in upgrader mode 116.

Figure 4:
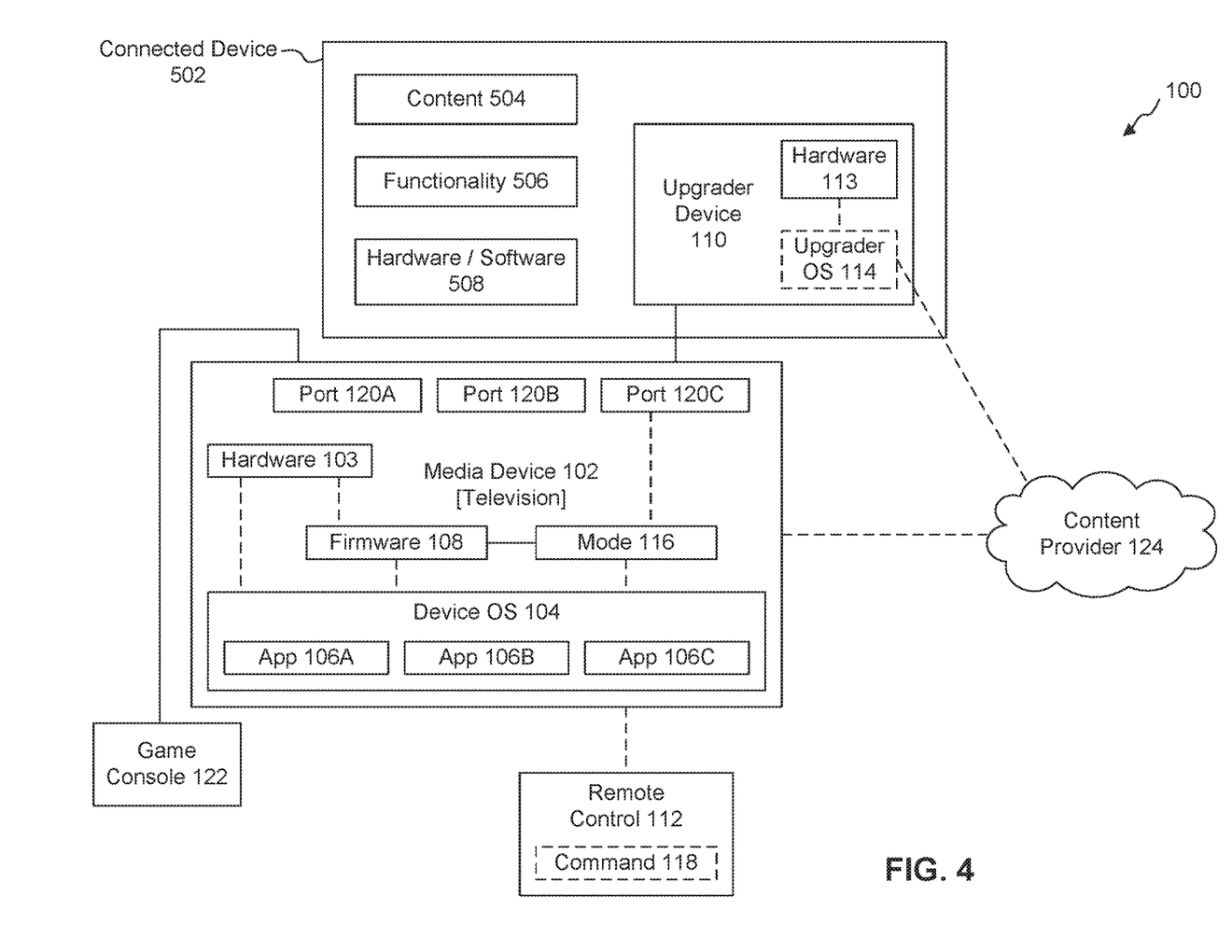
FIG. 4 illustrates an upgrader device that is part of a connected device, according to some embodiments.

As shown in FIG. 4, in some embodiments, the upgrader device 110 may be part of a connected device 502, such as a game console, soundbar, voice responsive speaker, APPLE TV, AMAZON ECHO, XBOX, NINTENDO SWITCH, smartphone, appliance, Internet of Things (IoT) device, etc. The connected device 502 may be connected to the TV 102 via any means, such as HDMI CEC (consumer electronics control), Wi-Fi, cellular, etc. The connected device 502 may store or have access to its own content 504, such as games, music and movie library, audio books, software, etc. The connected device 502 may also have its own functionality 506 (which may be implemented via hardware and/or software 508 in the connected device 502). Such functionality 506 may include gaming related capabilities in the case of XBOX and NINTENDO SWITCH, home entertainment related capabilities in the case of APPLE TV, and/or personal digital assistant related capabilities in the case of AMAZON ECHO, to name just some non-limiting examples.

The upgrader device 110, when part of the connected device 502 as shown in FIG. 4, may operate in the same manner as described above. However, when part of the connected device 502, the upgrader device 110 may also provide the TV 102 with additional and/or enhanced features relating to the content 504 and/or functionality 506 of the connected device 502. For example, the upgrader device 110 may cause content 504 to be advertised on the TV 102, and to playback the content 504 on the TV 102 when so instructed by users. In the example where the connected device 502 is an XBOX, the upgrader device 110 may cause an XBOX game row to be displayed on a home screen of the TV 102, or cause a banner advertisement for a particular game (such as CALL OF DUTY) to be displayed on the TV 102.

In the example where the connected device 502 is an APPLE TV, the upgrader device 110 may cause an APPLE ITUNES row to be displayed on the home screen of the TV 102.

When the user selects CALL OF DUTY or APPLE ITUNES in the above examples, the upgrader OS 114 may cause the respective apps in the hardware/software 508 to execute on the TV 102. This is the case for any of the content 504 and functionality 506 of the connected device 502.

In some embodiments, the connected device 502 advertises when it is initially connected to the TV 102. In the case where the connection is via HDMI, for example, the connected device 502 may advertise via EDID (Extended Display Identification Data) or CEC, or the TV 102 may otherwise recognize the device ID or name of the connected device 502.

Figure 5:
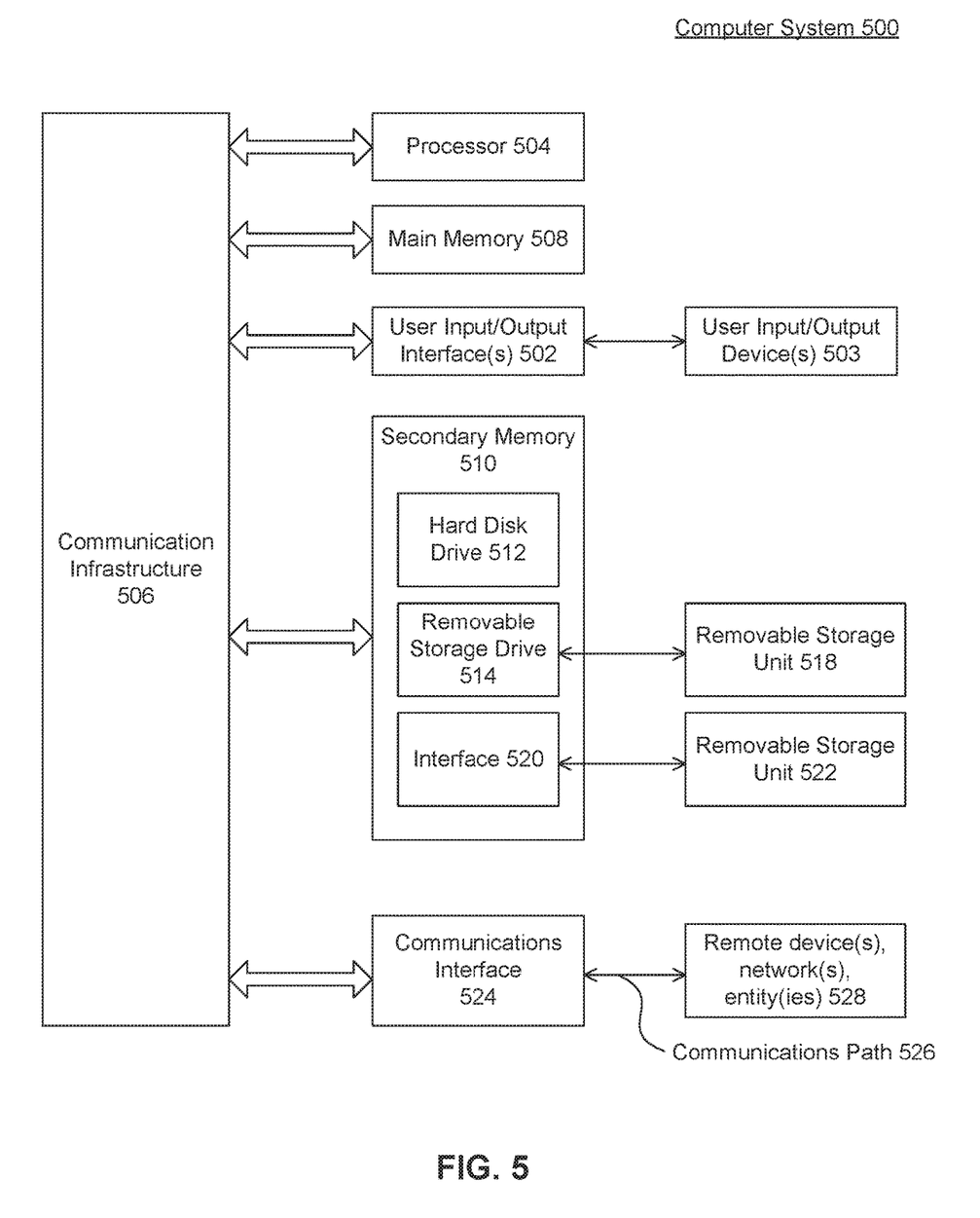
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/ any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
    displaying a native user interface of a media device configured to enable a remote control configured to control the media device during a normal mode without an upgrader device;
    determining that the media device includes the upgrader device connected via an input port of the media device, wherein the upgrader device is configured to improve operations of the media device responsive to selections made via the remote control during an upgrader mode, wherein the native user interface is displayed during both the normal mode and the upgrader mode;
    receiving, via the native user interface, a command at the media device, wherein the media device is configured to operate in the normal mode during which the command is processed by the media device, and the upgrader mode during which the command is processed by the upgrader device, wherein the upgrader device includes its own networking capabilities independent from the media device;
    determining that the command is associated with modifying a software component of the media device, wherein the media device includes firmware that is configured to process a request for operating a hardware component of the media device regardless of whether the media device is operating in the normal mode or the upgrader mode, wherein both the media device and the upgrader device include operating systems configured to process the command and modify the software component, and wherein the software component during the upgrader mode utilizes the networking capabilities of the upgrader device;
    providing the command to the upgrader device based on a determination that the media device is in the upgrader mode; and
    providing, via the media device, a visual indication corresponding to the modification.

2. The method of claim 1, wherein the media device includes a television, and wherein the software component includes an application configured to stream content for display on the television.

3. The method of claim 1, wherein a display of a command menu during the normal mode is identical to a display of the command menu during the upgrader mode.

4. The method of claim 1, wherein the hardware component includes a changing of an active input port of the media device to an input port that does include the upgrader device.

5. The method of claim 1, wherein the upgrader device includes hardware upgrades relative to a hardware of the media device.

6. A media device system, comprising:
    a memory; and
    at least one processor coupled to the memory and configured to:
    display a native user interface of a media device configured to enable a remote control configured to control the media device during a normal mode without an upgrader device;
    determine that the media device includes the upgrader device connected via an input port of the media device, wherein the upgrader device is configured to improve operations of the media device responsive to selections made via the remote control during an upgrader mode, wherein the native user interface is displayed during both the normal mode and the upgrader mode;
    receive, via the native user interface, a command at the media device, wherein the media device is configured to operate in the normal mode during which the command is processed by the media device, and the upgrader mode during which the command is processed by the upgrader device, wherein the upgrader device includes its own networking capabilities independent from the media device;
    determine that the command is associated with modifying a software component of the media device, wherein the media device includes firmware that is configured to process a request for operating a hardware component of the media device regardless of whether the media device is operating in the normal mode or the upgrader mode, wherein both the media device and the upgrader device include operating systems configured to process the command and modify the software component, and wherein the software component during the upgrader mode utilizes the networking capabilities of the upgrader device;
    provide the command to the upgrader device based on a determination that the media device is in the upgrader mode; and
    provide, via the media device, a visual indication corresponding to the modification.

7. The system of claim 6, wherein the media device includes a television, and wherein the software component includes an application configured to stream content for display on the television.

8. The system of claim 6, wherein the hardware component includes a changing of an active input port of the media device to an input port that does include the upgrader device.

9. The system of claim 6, wherein the upgrader device includes hardware upgrades relative to a hardware of the media device.

10. The system of claim 9, wherein the hardware upgrades enable faster processing of the command by the upgrader device relative to the media device.

11. A computer-implemented method, comprising:
displaying a native user interface of a media device configured to enable a remote control configured to control the media device during a normal mode without an upgrader device;
determining that the media device includes the upgrader device connected via an input port of the media device, wherein the upgrader device is configured to improve operations of the media device responsive to selections made via the remote control during an upgrader mode, wherein the native user interface is displayed during both the normal mode and the upgrader mode;
receiving an indication to enter the upgrader mode for the media device;
configuring, the media device, to process one or more hardware commands for modifying an operation of the media device when received from the remote control, wherein the media device includes firmware that is configured to process a request for operating a hardware component of the media device regardless of whether the media device is operating in the normal mode or the upgrader mode, and wherein the upgrader device includes its own networking capabilities independent from the media device;
configuring the media device to provide one or more operational commands to the upgrader device, wherein the one or more operational commands modify an operation of a software component associated with the media device, and wherein the software component during the upgrader mode utilizes the networking capabilities of the upgrader device; and
providing an indication, via the media device, that the media device is operational in the upgrader mode.

12. The method of claim 11, wherein the media device includes a television, and wherein the software component includes an application configured to stream content for display on the television.

13. The method of claim 12, wherein the upgrader device is plugged into a high-definition multimedia interface (HDMI) port of the television, and wherein the upgrader device is configured to stream the content directly for display via the television.

14. The method of claim 12, wherein the upgrader device is plugged into a universal serial bus (USB) port of the television, and wherein the upgrader device is configured to receive the streamlining content via a network port of the television for display via the television.

15. An upgrader device coupled to a television (TV), the TV comprising first hardware and a first operating system (OS), comprising:
second hardware that comprises at least one processor; and
a second OS;
wherein the upgrader device is compatible with a native user interface of the TV, wherein the native user interface is displayed for both operations utilizing the second hardware of the upgrader device and operations utilizing the first hardware of the television, and
wherein the at least one processor is configured to execute commands on the TV using the second hardware and the second OS, wherein the first hardware and the first OS are incapable of adequately executing the commands on the TV, wherein the TV includes firmware that is configured to process a request for operating a hardware component of the TV regardless of whether a media device is operating in a normal mode associated with the TV or an upgrader mode associated with the second hardware and second OS, wherein the upgrader device includes its own networking capabilities independent from the media device, and wherein a software component during the upgrader mode utilizes the networking capabilities of the upgrader device.

16. The upgrader device of claim 15, wherein the upgrader device is part of a connected device having content and functionality, and wherein the at least one processor is further configured to provide the content and functionality of the connected device to the TV using the second hardware and/or the second OS.

17. The method of claim 1, wherein the command and request are both received from the remote control.

18. The method of claim 2, wherein the native user interface to access the software component is identical in both the upgrader mode and the normal mode.

19. The method of claim 5, wherein device-specific hardware commands are processed by the hardware of the media device in both the normal mode and the upgrader mode.

20. A non-transitory computer-readable medium having instructions stored thereon that, when executed by at least one processor, cause the at least one processor to perform operations comprising:
displaying a native user interface of a media device configured to enable a remote control configured to control the media device during a normal mode without an upgrader device;
determining that the media device includes the upgrader device connected via an input port of the media device, wherein the upgrader device is configured to improve operations of the media device responsive to selections made via the remote control during an upgrader mode, wherein the native user interface is displayed during both the normal mode and the upgrader mode;
receiving, via the native user interface, a command at the media device, wherein the media device is configured to operate in the normal mode during which the command is processed by the media device, and the upgrader mode during which the command is processed by the upgrader device, wherein the upgrader device includes its own networking capabilities independent from the media device;
determining that the command is associated with modifying a software component of the media device, wherein the media device includes firmware that is configured to process a request for operating a hardware component of the media device regardless of whether the media device is operating in the normal mode or the upgrader mode, wherein both the media device and the upgrader device include operating systems configured to process the command and modify the software component, and wherein the software component during the upgrader mode utilizes the networking capabilities of the upgrader device;
providing the command to the upgrader device based on a determination that the media device is in the upgrader mode; and providing, via the media device, a visual indication corresponding to the modification.

21. The computer-readable medium of claim 20, wherein the media device includes a television, and wherein the software component includes an application configured to stream content for display on the television.

22. The computer-readable medium of claim 21, wherein the native user interface to access the software component is identical in both the upgrader mode and the normal mode.

\* \* \* \* \*